United States Patent Office 2,947,728
Patented Aug. 2, 1960

2,947,728
CATALYTIC POLYMERIZATION OF TRIOXANE

Kenneth W. Bartz, Summit, N.J., assignor to Celanese Corporation of America, New York, N.Y., a corporation of Delaware No Drawing. Filed Oct. 21, 1957, Ser. No. 691,141

8 Claims. (Cl. 260—67)

This invention relates to polymeric materials and more particularly to a method for producing a tough, high molecular weight material by the polymerization of trioxane.

Trioxane is a cyclic trimer of formaldehyde having a six-membered heterocyclic ring consisting of alternating oxygen atoms and methylene groups. In pure state it melts at 64° C. and boils without decomposition at approximately 115° C.

It is known that trioxane may be polymerized in the presence of certain specific inorganic fluorides, such as antimony trifluoride, to produce a tough high molecular weight polymer, known as polyoxymethylene, after a polymerization period ranging from one to seven days. It has been reported that the nature of the inorganic fluoride is quite critical and many metallic fluorides, such as sodium fluoride, calcium fluoride, lead fluoride and ferric fluoride show no catalytic activity.

It is an object of this invention to provide a new process for making a tough, high molecular material from trioxane utilizing catalytic materials previously not known to be effective.

It is a further object of this invention to provide a process for making a tough, high molecular weight material from trioxane, in which conversion takes place in minutes rather than days. Other objects will appear hereinafter.

The objects of this invention are accomplished by a process which comprises polymerizing trioxane in the presence of a catalyst selected from the group consisting of thionyl chloride, phosphorus trichloride, stannic chloride, titanium tetrachloride and zirconium chloride.

Preferably, the polymerization takes place in molten trioxane. However, the temperature of the reaction may vary from about 0° C. to substantially the boiling point and the trioxane may be in solid phase at the lower temperatures.

The catalyst should be present in the polymerization zone in amounts between about 0.001 and about 1.0 weight percent, based on the weight of trioxane in the polymerization zone. Preferably, amounts between about 0.10 and about 0.01 weight percent should be used.

The trioxane and the catalyst are preferably anhydrous or substantially anhydrous. Small amounts of moisture, such as may be present in commercial grade trioxane do not preclude the formation of an acceptable product. However, for best results, commercial trioxane should be dehydrated.

In one method of preparation, the trioxane is maintained as a molten body at a temperature between about 70° and about 80° C. A measured amount of catalyst is added with vigorous stirring. The desired polymer is produced within thirty minutes or less when using stannic chloride, titanium tetrachloride, or zirconium tetrachloride as the catalyst. Thionyl chloride and phosphorus trichloride generally require longer polymerization periods, up to about 24 hours.

If desired, a more even distribution of the catalyst into the body of molten trioxane may be achieved by dissolving the catalyst in a solvent, such as benzene, and then rapidly dispersing the catalyst solution into the body of molten trioxane. The total amount of catalyst added in the solvent is within the range specified above. A complete description of this procedure may be found in application Serial No. 691,145, filed on October 21, 1957 by Donald E. Hudgin and Frank M. Berardinelli.

Another advantageous procedure involves the polymerization wherein the trioxane is in solution in a solvent, such as benzene or cyclohexane. Catalyst is added in the proportion stated above, based on the weight of trioxane in solution. The polymer comes out of solution as it is formed. A complete description of this method of procedure may be found in said application Serial No. 691,145.

In still another advantageous procedure, the trioxane is suspended in an inert liquid such as normal decane which is at least partially a non-solvent therefor. Catalyst in the amount specified above is added and solid polymer is quickly formed in the suspended trioxane. A complete description of this method of procedure may be found in application Serial No. 691,142, filed on October 21, 1957 by Donald E. Hudgin and Frank M. Berardinelli.

The polymer, after formation, is washed clean of monomer, if any, catalyst and solvent or suspension medium if any; when there is no solvent or suspension medium one or more water washes will generally suffice. Where a solvent or suspension medium is used, the polymer is generally washed first with aqueous ammonia or with an organic solvent, such as ether, and then finally washed with water.

The washed polymer may be compression molded at 180° C. for two minutes, particularly after stabilization with five weight percent of diphenylamine to produce tough molded objects.

EXAMPLE I

In each of the following runs, 100 grams of trioxane was heated to the temperature indicated in a 250 ml. beaker covered with aluminum foil. 0.50 ml. of catalyst was added, as such, or dissolved in solvent, as indicated. Polymerization was permitted to continue for the period indicated and thereafter the polymer was agitated with boiling water, filtered and washed with ether. After filtration the polymer was dried for 15 hours at 65° C. The results are shown in the following table:

Table I

| Charge and Catalyst | Temperature Range, Degrees | Time | Result |
|---|---|---|---|
| 1. 100 g. $C_3H_6O_3$ and 0.5 ml. of $SnCl_4$ | 70-80 | 1 min. | Polymer obtained. |
| 2. 100 g. of $C_3H_6O_3$ and 0.1 ml. $SnCl_4$ in 20 ml. ether | 70 | 1 min. | Do. |
| 3. 150 g. $C_3H_6O_3$ and 0.15 ml. $SOCl_2$ in 10 ml. ether | 70 | 30 min. | Negative. |
| 4. 150 g. $C_3H_6O_3$ and 0.1 ml. of $SOCl_2$ | 70-80 / 90 | 30 min. / 15 min. | Do. / Do. |
| 5. 150 g. $C_3H_6O_3$ and 0.08 ml. $PCl_3$ | 70 / 90 | 30 min. / 15 min. | Do. / Do. |
| 6. 100 g. of $C_3H_6O_3$ and 0.10 ml. $PCl_3$ in 20 ml. ether | 70 / 90 | 30 min. / 15 min. | Do. / Do. |
| 7. 100 g. of $C_3H_6O_3$ and $TiCl_4$ (0.15 ml.) | 70 | Several min. | Polymer obtained. |
| 8. 100 g. of $C_3H_6O_3$ and 0.1 g. of $ZrCl_4$ in 20 cc. ether and 5 cc. of EtOH | 70 / 80-90 | 15 min. / Several min. | Do. / Do. |

EXAMPLE II

In this series of runs a quantity of trioxane was melted and filtered under a slight vacuum. In each run, 50 grams of molten trioxane was poured into a 50 ml. test tube equipped with a ground glass stopper, and the trioxane was allowed to solidify. Thereafter, 0.5 ml. of catalyst, dissolved in a solvent where indicated, was added, the tubes were secured and placed in a constant temperature bath maintained at 75° C. The tubes were fastened in such a manner to experience a slow rotary movement and were kept in the constant temperature bath for 30 hours. After cooling the tubes were opened, the polymer was removed with the aid of mechanical drills, was finally crushed and purified as in Example I. the results were as follows:

Table II

| Charge and Catalyst | Temperature Range, Degrees | Time, hrs. | Result |
|---|---|---|---|
| 1. 47 g. of $C_3H_6O_3$ and 0.50 cc. of $SOCl_2$ | 75 | 20 | Polymer obtained. |
| 2. 46 g. of $C_3H_6O_3$ and 0.50 cc. of $SOCl_2$ in 10 cc. ether | 75 | 20 | Do. |
| 3. 50 g. of $C_3H_6O_3$ and 0.5 cc. of $PCl_3$ | 75 | 20 | Do. |
| 4. 46 g. of $C_3H_6O_3$ and 0.5 cc. of $PCl_3$ in 10 cc. ether | 75 | 20 | Do. |

It is to be understood that the foregoing detailed description is merely given by way of illustration and that many variations may be made therein without departing from the spirit of my invention.

Having described my invention, what I desire to secure by Letters Patent is:

1. A process for preparing a tough, high molecular weight material which comprises polymerizing trioxane under substantially anhydrous conditions in contact with not more than about 1%, based on the weight of trioxane, of a catalyst selected from the group consisting of thionyl chloride, phosphorus trichloride, stannic chloride, titanium tetrachloride, and zirconium tetrachloride.

2. A process for preparing a tough, high molecular weight material which comprises polymerizing trioxane under substantially anhydrous conditions for a period between about ½ minute and about 24 hours in contact with not more than about 1%, based on the weight of trioxane, of a catalyst selected from the group consisting of thionyl chloride, phosphorus trichloride, stannic chloride, titanium tetrachloride and zirconium tetrachloride.

3. A process for preparing a tough, high molecular weight material which comprises polymerizing trioxane under substantially anhydrous conditions in admixture with between about 0.1 and about 0.01 weight percent, based on the weight of trioxane, of a catalyst selected from the group consisting of thionyl chloride, phosphorus trichloride, stannic chloride, titanium tetrachloride, and zirconium tetrachloride.

4. A process for preparing a tough, high molecular weight material which comprises polymerizing trioxane under substantially anhydrous conditions in admixture with from about 0.001 to about 1.0 weight percent, based on the weight of trioxane, the catalyst selected from the group consisting of stannic chloride, titanium tetrachloride and zirconium tetrachloride.

5. A process for preparing a tough, high molecular weight material which comprises polymerizing trioxane under substantially anhydrous conditions for a period between about ½ and about 30 minutes in admixture with from about 0.001 to about 1.0 weight percent, based on the weight of trioxane, a catalyst selected from the group consisting of stannic chloride, titanium tetrachloride and zirconium tetrachloride.

6. A process for preparing a tough, high molecular weight material which comprises polymerizing trioxane under substantially anhydrous conditions in admixture with between about 0.10 and about 0.01 weight percent, based on the weight of trioxane, of a catalyst selected from the group consisting of stannic chloride, titanium tetrachloride and zirconium tetrachloride.

7. The process of claim 3 wherein said polymerization is carried out at a temperature between 0° C. and the boiling point of trioxane for a period of between about ½ minute and about 24 hours.

8. The process of claim 6 wherein said polymerization is carried out at a temperature between 0° C. and the boiling point of trioxane for a period between about ½ minute and 30 minutes.

References Cited in the file of this patent

UNITED STATES PATENTS

| 2,270,135 | Mikeska et al. | Jan. 13, 1942 |
| 2,304,080 | Frank | Dec. 8, 1942 |
| 2,768,994 | MacDonald | Oct. 30, 1956 |
| 2,795,571 | Schneider | June 11, 1957 |

OTHER REFERENCES

Walker: "Formaldehyde," A.C.S. Monograph 120 (1953), chapter 7.